(12) United States Patent
Tomasoni et al.

(10) Patent No.: US 12,451,185 B2
(45) Date of Patent: Oct. 21, 2025

(54) METHOD FOR STORING INFORMATION IN A CODED MANNER IN NON-VOLATILE MEMORY CELLS, DECODING METHOD AND NON-VOLATILE MEMORY

(71) Applicant: STMICROELECTRONICS S.r.l., Agrate Brianza (IT)

(72) Inventors: Alessandro Tomasoni, Sotto il Monte Giovanni XXIII (IT); Fabio Enrico Carlo Disegni, Spino d'Adda (IT); Marcella Carissimi, Treviolo (IT); Daniele Lo Iacono, Bergamo (IT)

(73) Assignee: STMICROELETRONICS S.r.l., Agrate Brianza (IT)

( * ) Notice: Subject to any disclaimer, the term of this patent is extended or adjusted under 35 U.S.C. 154(b) by 376 days.

(21) Appl. No.: 18/148,378

(22) Filed: Dec. 29, 2022

(65) Prior Publication Data

US 2023/0223079 A1 Jul. 13, 2023

(30) Foreign Application Priority Data

Jan. 7, 2022 (IT) .......................... 102022000000176

(51) Int. Cl.
*G11C 11/56* (2006.01)
*G11C 13/00* (2006.01)

(52) U.S. Cl.
CPC ...... *G11C 11/5678* (2013.01); *G11C 13/0004* (2013.01); *G11C 13/0023* (2013.01); *G11C 13/004* (2013.01); *G11C 2013/0054* (2013.01)

(58) Field of Classification Search
CPC ...................... G11C 13/004; G11C 2013/0054
(Continued)

(56) References Cited

U.S. PATENT DOCUMENTS 8,988,946 B1 3/2015 D'Abreu
9,349,490 B2 5/2016 Carissimi et al.
(Continued)

FOREIGN PATENT DOCUMENTS

WO WO 2021135839 A1 7/2021

*Primary Examiner* — Anthan Tran
(74) *Attorney, Agent, or Firm* — SEED INTELLECTUAL PROPERTY LAW GROUP LLP

(57) ABSTRACT

The present disclosure is directed to a method for storing information in a coded manner in non-volatile memory cells. The method includes providing a group of non-volatile memory cells of non volatile memory. The memory cell is of the type in which a stored logic state, which can be logic high or logic low, can be changed through application of a current to the cell and the state in the memory cell is read by reading a current provided by the cell. The group of non-volatile memory cells include a determined number of non-volatile memory cells which is greater than two. The group of non-volatile memory cells store a codeword formed by the values of said stored states of the cells of the group taken according to a given order. Given a set of codewords obtainable by the stored values in the determined number of non-volatile memory cells in a group, the method includes storing the information in at least two subsets of said set of codewords comprising each at least a codeword. Each codeword in a same subset has a same Hamming weight. Each codeword belonging to one subset has a Hamming distance equal or greater than two with respect to each codeword belonging to another subset.

20 Claims, 11 Drawing Sheets

(58) Field of Classification Search
USPC .......................................................... 365/163
See application file for complete search history.

(56) References Cited

U.S. PATENT DOCUMENTS

| | | | |
|---|---|---|---|
| 9,619,328 B2* | 4/2017 | Mittelholzer | ....... G06F 11/1076 |
| 10,319,438 B2 | 6/2019 | Calvetti et al. | |
| 11,133,064 B2 | 9/2021 | Carissimi et al. | |
| 2003/0035324 A1 | 2/2003 | Fujita et al. | |
| 2009/0067218 A1 | 3/2009 | Graber | |
| 2010/0085799 A1 | 4/2010 | Cho et al. | |
| 2016/0179619 A1 | 6/2016 | Mittelholzer et al. | |
| 2019/0215014 A1* | 7/2019 | Qin | ....................... H03M 13/19 |
| 2023/0245699 A1 | 8/2023 | Disegni et al. | |

* cited by examiner

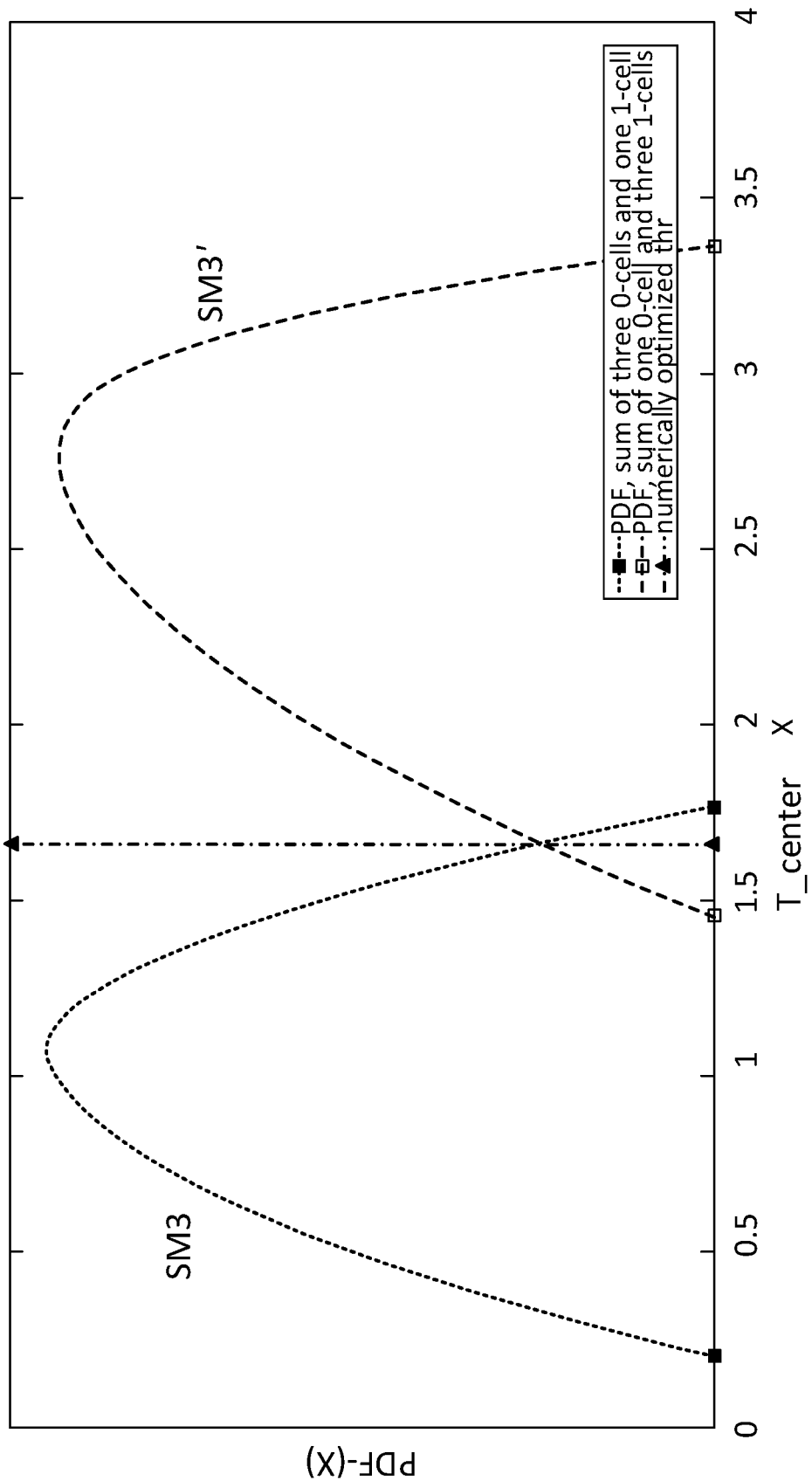

METHOD FOR STORING INFORMATION IN A CODED MANNER IN NON-VOLATILE MEMORY CELLS, DECODING METHOD AND NON-VOLATILE MEMORY

BACKGROUND

Technical Field

Embodiments of the present disclosure relate to techniques for storing information in a coded manner in non-volatile memory cells.

Description of the Related Art

In non-volatile memories, the strength of the physical signals may significantly vary during the life of the written data. For instance, years later after it was programmed, a cell with logical value one could generate a much lower current than the current experienced soon after the data was written. This problem can be solved by differential encoding, i.e., by storing not only the physical value "high" (or "low"), but also its negated value "low" (or "high") in a pair of cells: the logical value is therefore retrieved comparing the two physical values, even if they have drifted since the cells were programmed. The price to pay is the doubled number of cells used to store the same amount of information or, equivalently, the halved number of information bits that can be stored in the same number of cells.

Differential non-volatile memories are a special case of non-volatile memories. In non-volatile memories, the information is associated to different physical states of the memory. States can be inferred/changed by operating on the current flowing through the cell, such as PCM (Phase Change Memory), ST-RAM, (Magneto resistive Random Access Memory) RRAM (Resistive Random Access Memory). In Differential non-volatile memories, there are two cells types: direct and complementary in opposite state. The logic bit can be stored in two cells, one direct and one complementary in the differential memory architecture, or in a single cell. In the differential memory the cells receive the same wordline, and are coupled to a bitline and to a complementary bitline. The read operation consists in comparing the difference of current in the two branches of a sense amplifier receiving the currents of the direct and complementary cells as input. The output is the logic bit of the stored codeword.

In FIGS. 1A-1C are shown examples of PCM cells, which are used in differential memory architectures.

In FIG. 1A it is shown a non-volatile memory cell 11 comprising a FET 12, in general an access transistor in a compatible technology, which receives a wordline WL on its gate electrode, has its source coupled to a bitline BL through a phase transition resistor 13, which is for instance GST, and it can be switched from an amorphous high resistive phase to a crystalline low resistive phase by applying a short voltage pulse on the wordline WL, which determines a current passage in the phase transition resistor 13. The drain of the FET12 is coupled to a source line SL.

In FIG. 1B a non-volatile memory cell 21 is shown in which the FET 12 is substituted by a bipolar transistor 22 which is coupled to the bitline BL through the phase transition resistor 13 by its emitter, while its collector is coupled to ground GND. The base is coupled to the wordline WL.

In FIG. 1C a non-volatile memory cell 31 is shown which uses a diode 32 coupled by its positive terminal to the bitline BL through the phase transition resistor 11b and to the wordline WL at the other terminal.

In non-volatile memories area density is a key enabler. In most PCM memories the bit is differential so two cells are used for a single bit. Besides, an adequate error correcting code (ECC) is added to get a proper BER (Bit Error Rate). Among others, ECC can be:

SEC: single error correction. Any single error can be corrected.
DED: double error detection. Any combination of two errors can be detected.
DEC: double error correction. Any single error and any combination of two errors can be corrected.
TED: triple error detection. Any combination of three errors can be detected Specific cases can be:

Word size by 32 information bit+6 bit SEC+1 bit DED=39 bit. This combination utilizes 78 pcm cells elements.
Word size by 64 information bit+14 bit DEC+1 bit TED=79 bit. This combination utilizes 158 pcm cells element.
Word size by 128 bit information bit+16 bit DEC+1 bit TED=145 bit.

This combination utilizes 290 pcm cells element Therefore, from the data set out above turns out that PCM Array efficiency is less than 50%.

In Table 1 below efficiency results are summarized. Table 1 shows in the first column the wordsize, in the second column the number of PCM cells and in the third column the ratio efficiency.

TABLE 1

| Wordsize | PCM cells | Ratio Efficiency |
|---|---|---|
| 32 | 78 | 41% |
| 64 | 158 | 40% |
| 128 | 290 | 44% |

BRIEF SUMMARY

On the basis of the foregoing description, there is a desire for solutions which overcome one or more of the previously outlined drawbacks.

According to one or more embodiments, the previously outlined drawbacks are addressed through an encoding method having the features specifically set forth below. Embodiments moreover concern a decoding method system as well as a non-volatile memory.

As mentioned in the foregoing, the present disclosure provides solutions regarding a method for storing information in a coded manner in non-volatile memory cells, providing a group of non-volatile memory cells, the memory cell being of the type in which a stored logic state, which can be logic high or logic low, can be changed through application of a current to the cell and the state in the memory cell is read by reading a current provided by the cell, comprising a determined number of non-volatile memory cells which is greater than two, the group of non-volatile memory cells storing a codeword formed by the values of said stored states of the cells of the group taken according to a given order, wherein given a set of codewords obtainable by the stored values in the determined number of non-volatile memory cells in a group, storing the information in at least two subsets of said set of codewords comprising each at least a codeword, each codeword in a same subset having a same Hamming weight,
  each codeword belonging to one subset having a Hamming distance equal or greater than two with respect to each codeword belonging to another subset.

In variant embodiments, the determined number of non-volatile memory cells is an even number.

In variant embodiments, are provided a first subset with a codeword with all zero values, a second subset in which the codewords have all the same Hamming weight, a third subset with a codeword with all one values.

In variant embodiments, are provided a first subset in which the codewords have all a same first Hamming weight and a second subset in which the codewords have all a same second Hamming weight, different from the first Hamming weight by the value two.

The present disclosure also provides solutions regarding a method of decoding a group of cells of any of the previous embodiments, comprising
  reading the values stored in the cells of a group, in particular reading their cell currents,
  performing a comparison operation on said read values, comprising comparing pairwise all said read values obtaining a set of pairwise comparison results,
  processing the set of pairwise comparison results obtaining the corresponding codeword,
  decoding the corresponding codeword to supply a corresponding decoded symbol In variant embodiments, said comparison operation on said read values comprises also summing said read values to obtain a sum value and comparing said sum value to one or more thresholds each corresponding to a subset obtaining a value indicating the subset to which the read values belong,
  processing the set of pairwise comparison results separately for each subset comprising more than one codeword obtaining corresponding codewords, then selecting among said corresponding codewords and codewords of subsets comprising one codeword on the basis of the value indicating the subset to which the read values belong,
  decoding the corresponding codeword to supply a corresponding decoded symbol.

In variant embodiments, the method comprises computing said thresholds on the basis of Probability Density Function curves and/or Cumulative Distribution Function curves of the sum of the values of cells arranged in manner corresponding to each subset, in particular selecting as an approximation of the threshold or thresholds values the intersection or intersections or near to said intersection or intersections of said PDF curves or computing said threshold or thresholds values numerically by minimizing an error probability between the states associated to said thresholds.

The present disclosure also provides solutions regarding a memory, in particular a PCM memory, comprising groups of non-volatile memory cells, the memory cell being of the type in which a stored logic state, which can be logic high or logic low, can be changed through application of a current to the cell and the state in the memory cell is read by reading a current provided by the cell, comprising a determined number of non-volatile memory cells which is greater than two, said memory comprising an encoder configured to perform the method for storing information in a coded manner in non-volatile memory cells according to embodiments.

In variant embodiments, such memory comprises or is associated to an encoder configured to perform the method for storing information in a coded manner in non-volatile memory cells according to embodiments.

In variant embodiments, such memory comprises a decoder configured to perform the method of decoding a group of cells for storing information in a coded manner in non-volatile memory cells according to embodiments

BRIEF DESCRIPTION OF THE SEVERAL VIEWS OF THE DRAWINGS

Embodiments of the present disclosure will now be described with reference to the annexed drawings, which are provided purely by way of non-limiting example and in which:

FIG. 6 shows probability functions related to the third embodiment of a decoder circuit here described;

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience and do not interpret the scope or meaning of the embodiments.

Figures parts, elements or components which have already been described with reference to FIG. 1 are denoted by the same references previously used in such Figures; the description of such previously described elements will not be repeated in the following in order not to overburden the present detailed description.

The solution here described provides a method for storing information in a coded manner in non-volatile memory cells, providing a group of non-volatile memory cells, the memory cell being of the type in which a logic state, which can be logic high or logic low, stored can be changed through application of a current to the cell and the state in the memory cell is read by reading a current provided by the cell, comprising a determined number of non-volatile memory cells, the group of non-volatile memory cells storing a codeword formed by the values of said stored states of the cells of the group taken according to a given order, wherein given a set of codewords obtainable by the stored values in the determined number of non-volatile memory cells in a group, the codeword or codewords stored in said group of cells belong to at least two subsets of said set of codewords, each subset comprising at least a codeword, the codewords in a same subset having all the same Hamming weight.

Figure 1C:
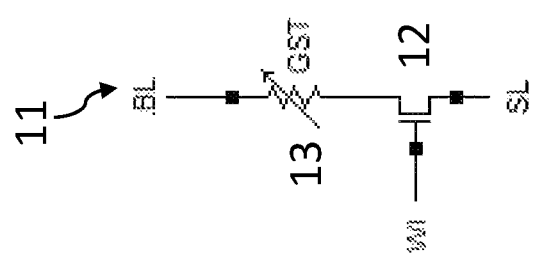
FIG. 1A, FIG. 1B, FIG. 1C show examples of PCM cells that are used in differential memory architectures.
Figure 1B:
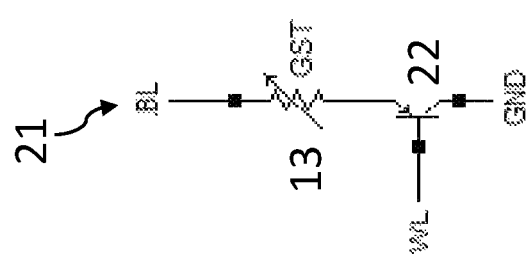
Figure 1A:
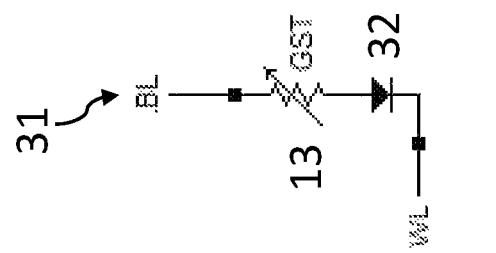

A group of non-volatile memory cells used with the method here described may include a number Nc of memory cells, for instance non-volatile memory cells 11, or 21, or 31, as described in FIG. 1A-1C, i.e., memory cells of the type in which a stored logic state, which can be logic high or logic low, can be changed through application of a current to the cell and the state in the memory cell is read by reading a current provided by the cell. The number of cells Nc in the group is greater than two, i.e., the group contains more cells than in a differential architecture. For instance the group of non-volatile memory cells may include a number Nc of memory cells equal to four.

The four cells in the group may be indicated as 11A, 11B, 11C, 11D, i.e., for example are of the type of the cell 11 in FIG. 1A.

In Table 2 it is shown an example T1 of encoding of information in such group of cells. In the second to fifth columns of Table 2 four states A, B, C, D stored in the cells 11A, 11B, 11C, 11D are shown. In the example shown in Table 2, there are six combinations of two logic "ones" and two logic "zeroes" formed by the states A, B, C, D taken in ordered manner, from A to D.

TABLE 2

Encoding T1

| Codeword CW | A | B | C | D | Symbol S |
|---|---|---|---|---|---|
| CW0 | 0 | 0 | 1 | 1 | 0 |
| CW1 | 0 | 1 | 0 | 1 | 1 |
| CW2 | 0 | 1 | 1 | 0 | 2 |
| CW3 | 1 | 0 | 1 | 0 | 3 |
| CW4 | 1 | 0 | 0 | 1 | 4 |
| CW5 | 1 | 1 | 0 | 0 | 5 |

Each combination in a row of Table 2 represents a codeword CW, composed by the ordered states A, B, C, D, taken in that order, e.g., CW0 corresponds to 0011, CW1 to 0101 and so on. To each codeword CW corresponds a symbol S, i.e., a value or data label to which the codeword CW of the corresponding word is mapped.

In the sixth column it is thus shown the corresponding symbol S, which, since there are six codewords CW, ranges from 0 to 5, the symbol S being represented in decimal numbers. Thus, a value or data label, corresponding to symbol S, ranging from 0 to 5 can be appended to every combination or pattern of logic states A, B, C, D. A mapping between the combination, or codewords CW, and the values or data labels, symbols S can be implemented in different ways.

Six values correspond to $\log_2(6)=2.58$ bit every four cells. Therefore, 5 bits can be saved on two groups of four cells 12 each. Such a rate $R=5/8$ is better than the rate $R=1/2$ of the differential scheme.

This rate can be improved, considering one single group of 8 cells instead of two groups of 4 cells, i.e., Nc=8, as shown in Table 3 below. Here below, in Table 3 is shown a further encoding T2 in which the group of 8 cells has eight logic states A, B, C, D, E, F, G, H forming a combination, indicated by Symbol S.

TABLE 3

Encoding T2

| CW | A | B | C | D | E | F | G | H | Symbol S |
|---|---|---|---|---|---|---|---|---|---|
| CW0 | 1 | 1 | 1 | 1 | 0 | 0 | 0 | 0 | 0 |
| CW1 | 1 | 1 | 1 | 0 | 1 | 0 | 0 | 0 | 1 |
| CW2 | 1 | 1 | 1 | 0 | 0 | 1 | 0 | 0 | 2 |
| CW3 | 1 | 1 | 1 | 0 | 0 | 0 | 1 | 0 | 3 |
| CW4 | 1 | 1 | 1 | 0 | 0 | 0 | 0 | 1 | 4 |
| CW5 | 1 | 1 | 0 | 1 | 1 | 0 | 0 | 0 | 5 |
| ... | ... | ... | ... | ... | ... | ... | ... | ... | ... |
| CW69 | 0 | 0 | 0 | 0 | 1 | 1 | 1 | 1 | 69 |

In this case, as shown there are 70 combinations, or codewords CW, of four "ones" and four "zeroes," which correspond to $\log_2(70)=6.12$ bit on 8 cells.

A decoder configured to implement a decoding of the group of four cells with the encoding T1 of Table 2, number of cells Nc=4, or the encoding T2 of Table 3, number of cells Nc=8, has to identify the position of the "ones" in the group of Nc cells. This can be obtained according to an aspect of the solution here described by comparing the current of each cell 12 once to each one of the currents of the other cells in the group of cells, e.g., cell 11A vs. cell 11B, cell 11A vs. cell 11C, cell 11A vs cell 11D, cell 11B vs. cell 11C, cell 11B vs cell 11D, cell 11C vs cell 11D. This set of pairwise comparators is certainly enough, because it would allow a sorting of a number Nc of cell currents, to identify the two "ones" and the two "zeroes," more in general the Nc/2 "ones" and the Nc/2 "zeroes."

Regarding the number of comparators used by such method, they are Nc*(Nc−1)/2=6 comparators used in case of 2.5 bit, Nc=4 cells, while they are Nc*(Nc−1)/2=28 comparators in case of 6 bit, Nc=8 cells.

For simplicity, let us consider the case of Nc=4, e.g., 2.5 bit stored, represented in Table 2.

Although the comparison would even allow a sorting of the currents, to evaluate the two cells with highest current, it is not necessary finding the complete order. For instance, a majority logic is enough to identify the saved codeword. For instance, assuming that the codeword 0011 has been stored: A=0, B=0, C=1, D=1. The following Table 4 summarizes the results expected at the output of the comparators:

TABLE 4

| Comparison Item | Comparison Results |
|---|---|
| A vs B | A or B either can win, X |
| A vs C | C |
| A vs D | D |
| B vs C | C |

TABLE 4-continued

| Comparison Item | Comparison Results |
|---|---|
| B vs D | D |
| C vs D | C or D either can win, X |

The first column shows the comparison between two states, e.g., their cell current read by the comparator, which is implemented for instance by a sense amplifier. The second column shows the corresponding result of the comparison at the output of the sense amplifier. X indicates an unknown result. Thus, Table 4 shows a comparison pairwise of the states A, B, C, D one with respect to the other, comparing each state once with each other state in set of states A, B, C, D and the comparison result expected in case A=0, B=0, C=1, D=1.

From Table 4 it can be seen that, given that the codewords have two one and two zeroes, the state in a cell is logical value 1 if the cell wins at least two comparisons with the other three cells, i.e., in the above example C and D are 1, A and B are 0. Thus, from the comparison results a logic circuit can easily output the values of the states A, B, C, D stored in the group of cells, attributing value 1 to a given state if there are at least two wins in the three comparisons involving a cell associated to the given state or zero else.

Figure 2A:
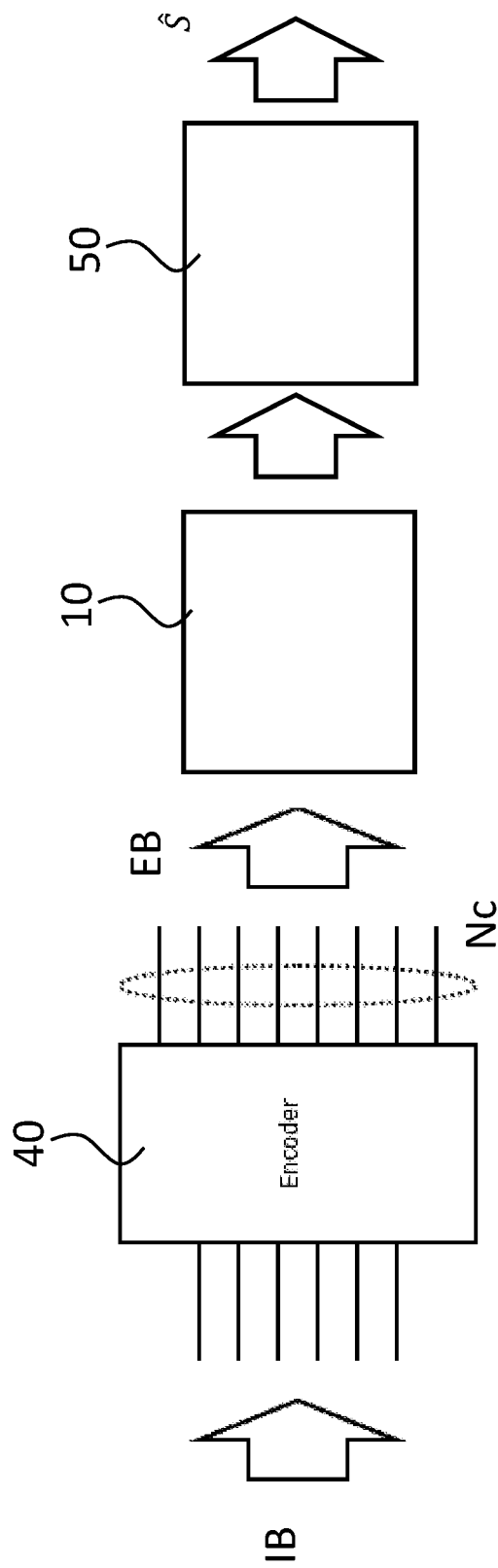
FIG. 2A shows schematically a memory system comprising and encoder and a decoder circuit here described.

In FIG. 2A it is shown a block schematics of a memory system comprising an encoder 40, a memory 10 and decoder 50.

The encoder 40 receives information bits IB, corresponding to symbols S, e.g., 0, 1, 2, . . . to be stored in the memory 10, and performs an encoding, providing encoded bits EB according to one of the encoding here described for instance the encoding T1 in Table 2, encoding the symbol S over the number of logic states, e.g., four logic states A, B, C, D in the example of Table 2, according to the encoding T1 there shown, i.e., from the symbols S into the codewords CW there shown, in group of cells, such as 11A, 11B, 11C, 11D. Of course, the encoder 40 may be exemplary of different encoding, as T3 or any of the encodings described in the following, e.g., T3 or T4.

The memory 10 stores in its groups of cells the codewords, which are then read and decoded by a decoder 50 into decoded data, i.e., decoded symbols $\hat{S}$.

The encoder 40 may be considered comprised in the memory 10 system or associated to it, i.e., coupled to it and operating with it, obtained for instance by a logic circuit or a processor, e.g., the same processor accessing the memory or another processor. In the same way the decoder 50 may be comprised in the memory 10 system or associated to it.

Figure 2B:
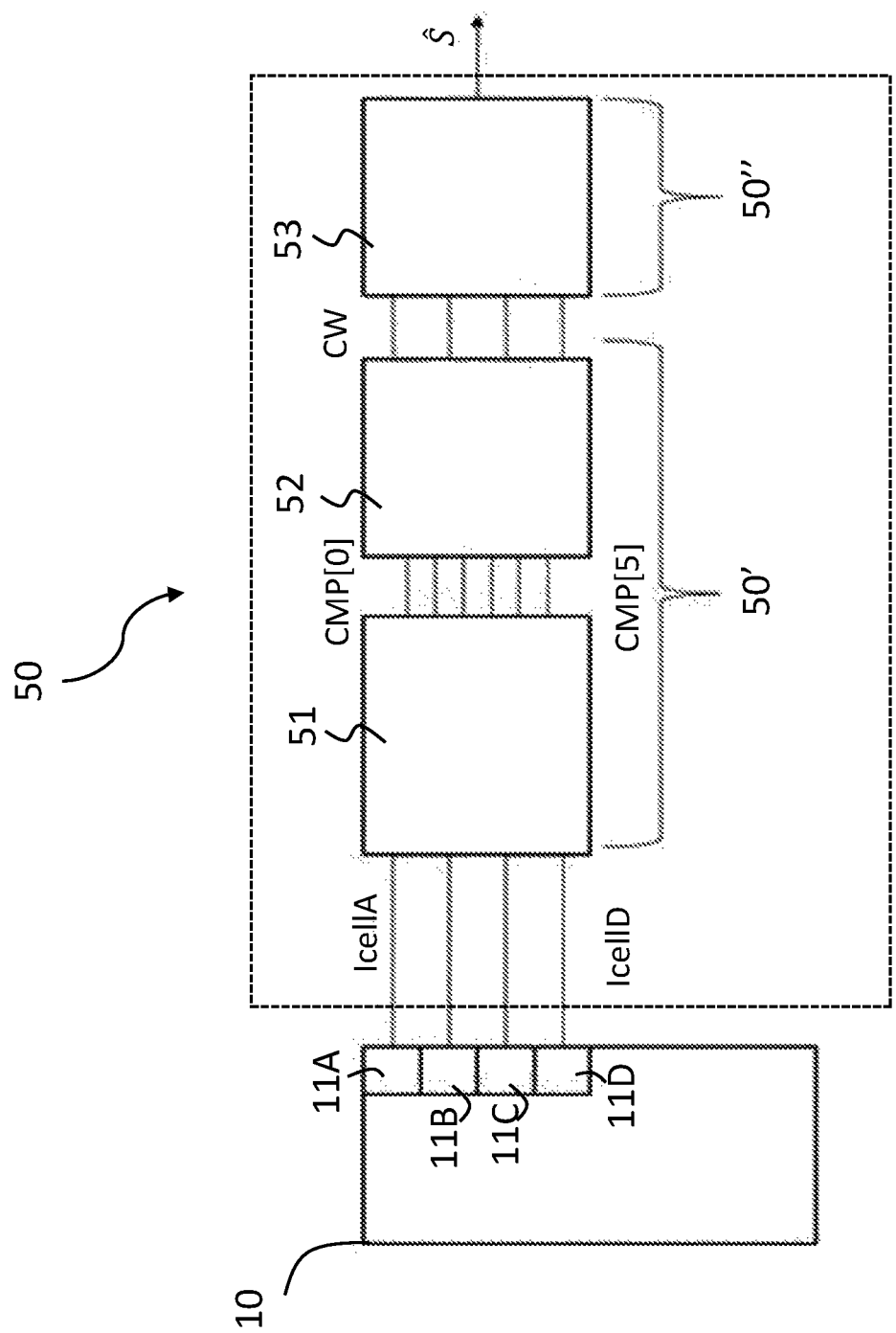
FIG. 2B shows schematically a first embodiment of a decoder circuit here described.

In FIG. 2B it is shown a block schematics of the decoder 50 configured to operate with an encoding T1 with a group of four cells like the one described in Table 2.

With 10 is indicated a PCM memory, comprising a plurality of cells 11, in which states are stored encoded for instance with encoding T1 in Table 2. In particular the PCM memory can include one or more groups of cells 11A, 11B, 11C, 11D.

The values of the states A, B, C, D stored in the cells 11A, 11B, 11C, 11D are read as currents IcellA, IcellB, IcellC, IcellD respectively and are supplied to the decoder 50.

The decoder 50 comprises a block 51 which receives the currents IcellA, IcellB, IcellC, IcellD and it is configured to perform a comparison of the cell values, i.e., currents IcellA, IcellB, IcellC, IcellD, comparing them pairwise, i.e., comparing one to another each pair of cell values or current obtainable from the group of cells 11A, 11B, 11C, 11D, given their number, e.g., with four cells six comparison, which are the one exemplified in Table 4, obtaining respective pairwise comparison results, CMP[0] . . . CMP[5], i.e., binary values, in particular bits, which are zero or one depending on which current of the two being compared is greater, and together composing a binary vector o vector of bits CMP[0 . . . 5]. The pairwise results, i.e., bits CMP[0] . . . CMP[5] which are arranged in such bit order in the vector CMP[0 . . . 5], are supplied as input to a block 52 configured to process the set of pairwise comparison results obtaining a corresponding read codeword CW. Such read codeword CW may be then supplied to a symbol decoder block 53, embodying a decoding portion 50", which is configured to output a corresponding decoded symbol $\hat{S}$ on the basis of the read codeword CW.

The blocks 51 and 52 represents a reading block 50' of the decoder 50, reading the codeword CW from the cell currents IcellA, IcellB, IcellC, IcellD, while the block 53 performs the final decoding to obtain the decoded symbol $\hat{S}$.

Figure 2C:
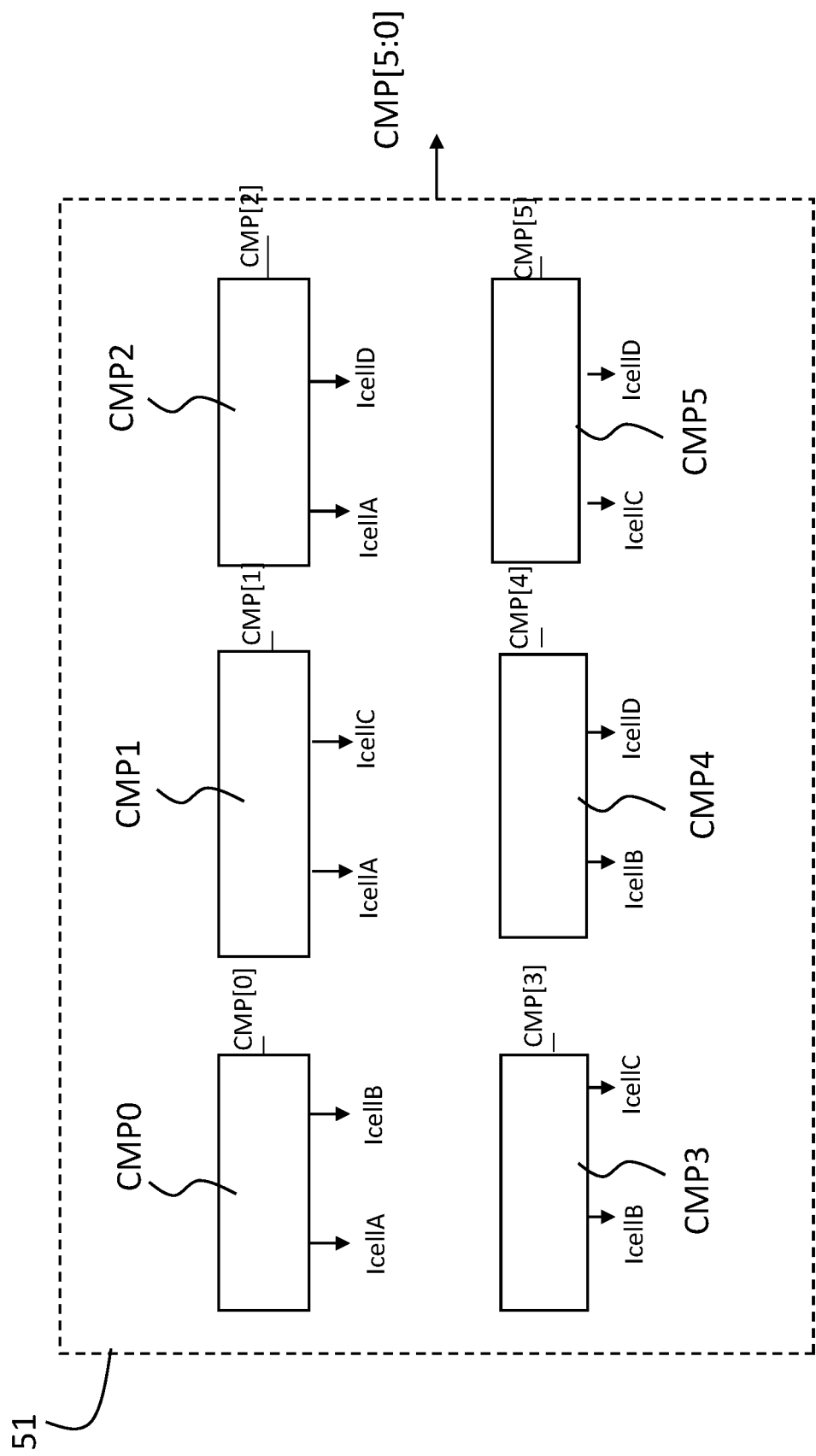
FIG. 2C shows an implementation of the first embodiment of a decoder circuit here described.

In FIG. 2C it shown in greater detail the block 51 comprising an architecture of comparators to read the cells 11A, 11B, 11C, 11D, in which values are stored according to the method of Table 2. The architecture of comparators comprises six comparators CMP0, CMP1, CMP2, CMP3, CMP4, CMP5 which compare pairwise the currents of the cells 11A, 11B, 11C, 11D. Comparator CMP0 compares the cell currents IcellA and IcellB and outputs a comparator signal CMP[0]. Comparator CMP1 compares the cell currents IcellA and IcellC and outputs a comparator signal CMP[1], i.e., the numbers of the comparators follow the order of the comparisons in Table 4. Cell currents are indeed inputs to the comparators, but they are represented in FIG. 2C as if they were outputs, to mimic the electrical circuit of cells 11, where cells in SET state drain current.

A total comparator output CMP[5:0], which is an array of output signals CMP[0] to CMP[5] fully determine the read codeword CW as the decided codeword CW.

The embodiments described with reference to Table 1 and Table 2 determine that every codeword CW has the same number of "ones" and "zeros," i.e., the same Hamming weight. Therefore, each codeword CW has the same probability of being affected by errors. There are no codewords weaker than others. Also, all codewords CW have Hamming distance at least of two with respect to any other sequence (like in the differential scheme). There is then no need for an absolute threshold (possibly affected by noise). The threshold is implicit, and its computation can be avoided by leveraging on the additional information that every codeword in the group of Table 2 or Table 4 has constant, i.e., the same, Hamming weight.

Figure 3B:
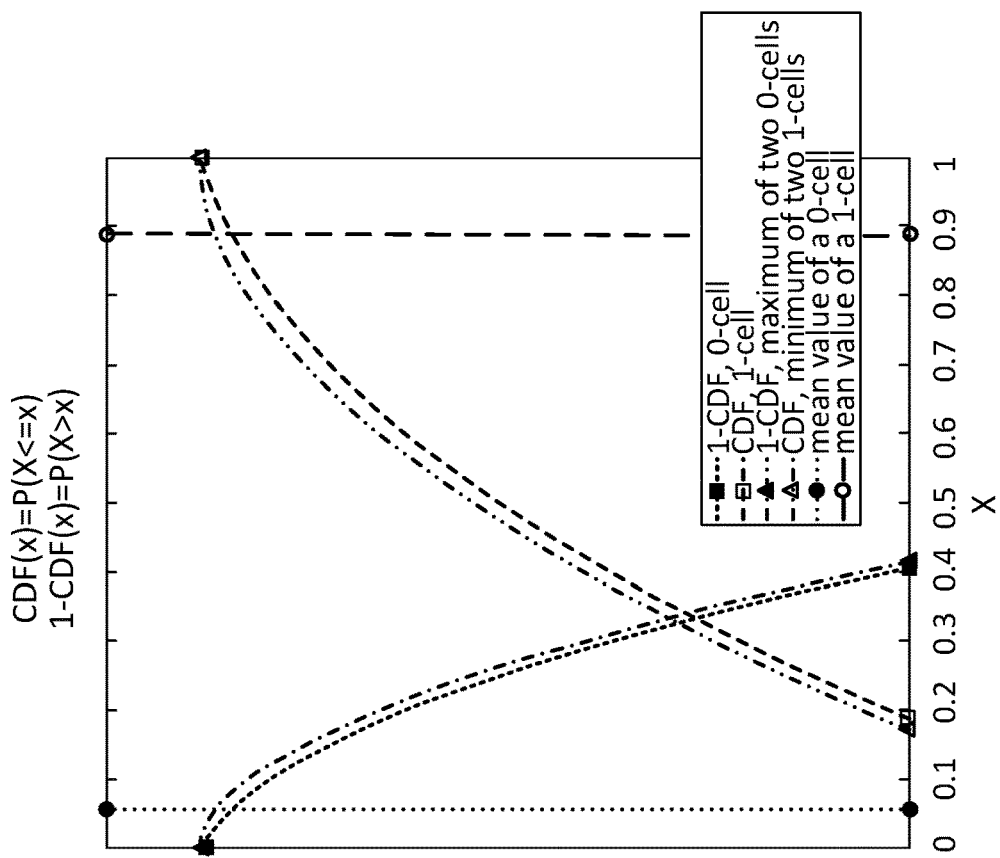
FIGS. 3A and 3B show probability functions related to the first embodiment of a decoder circuit here described.
Figure 3A:
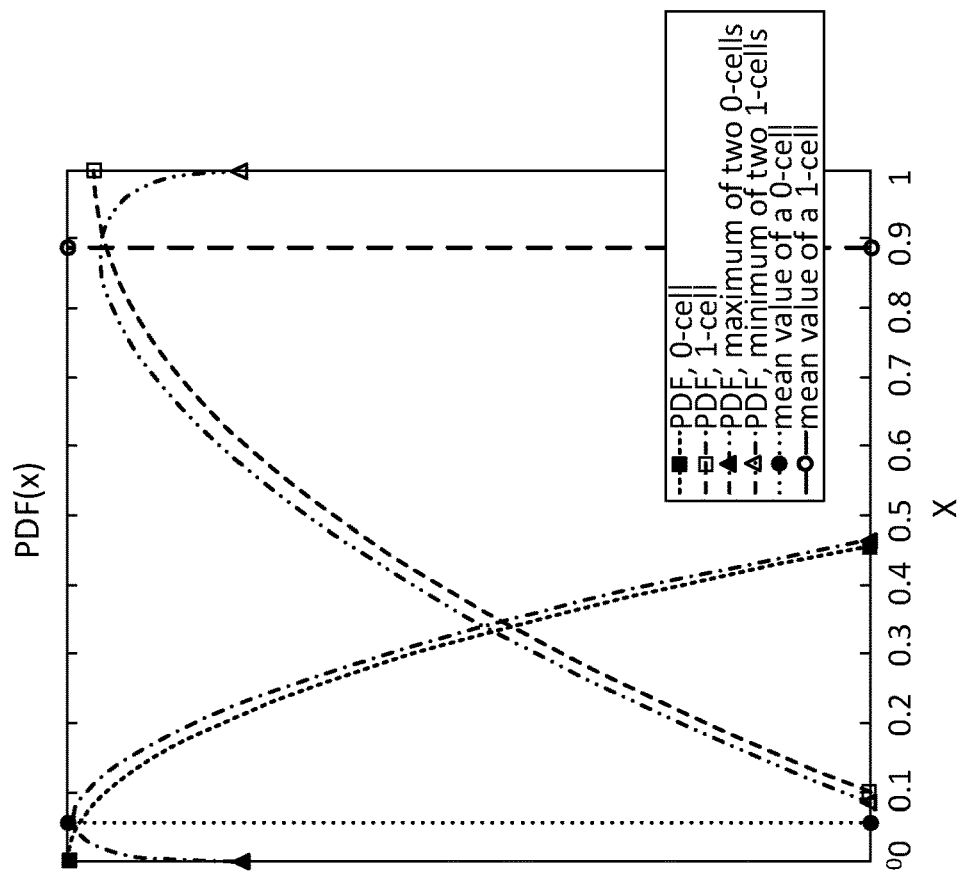
Figure 4:
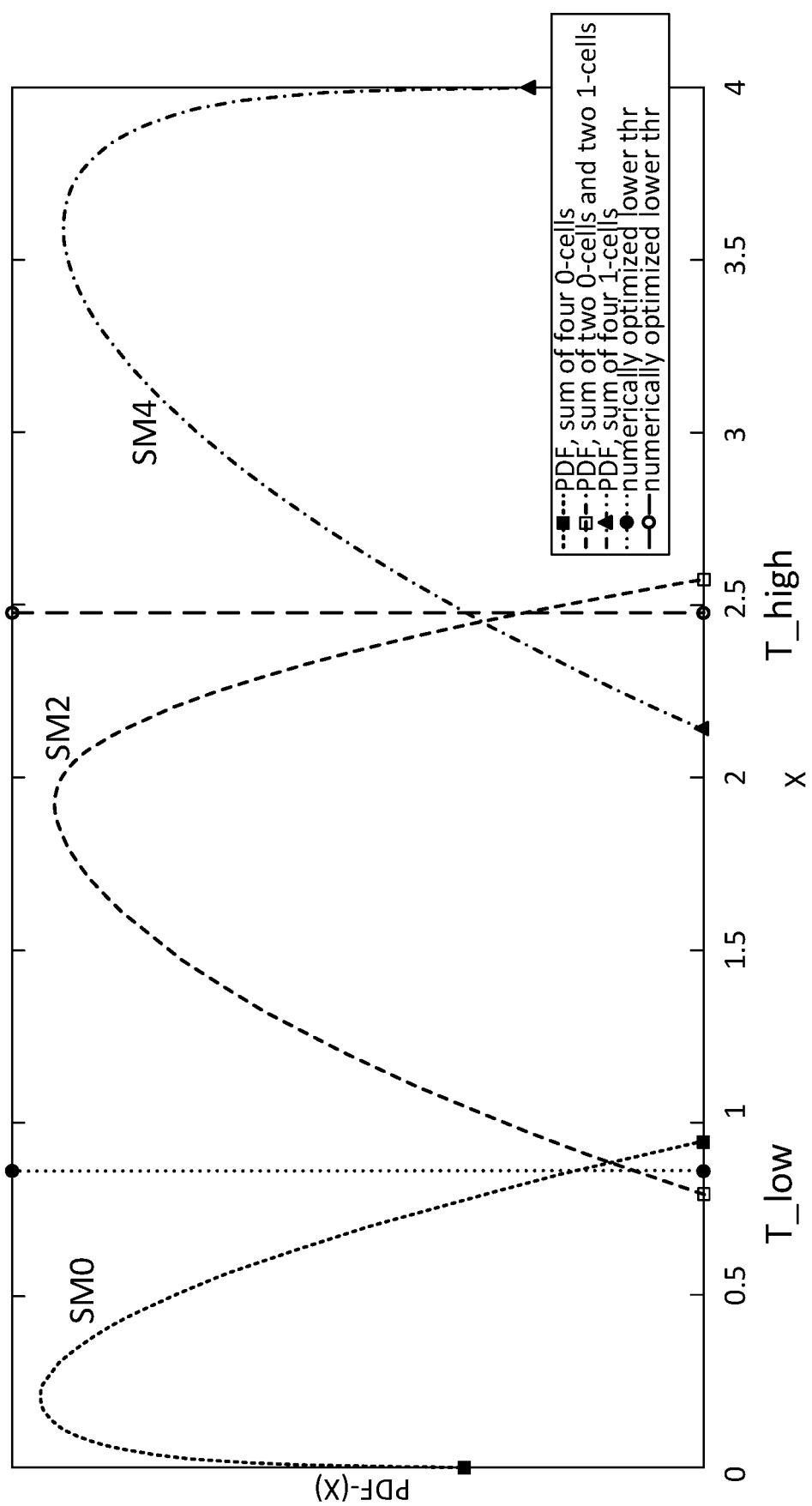
FIG. 4 shows probability functions related to the second embodiment of a decoder circuit here described.

In FIG. 3A it is shown an exemplary Probability Density Function based on a model of the cells, with different variance of the logical zeroes and ones as a function of a normalized value x, normalized between 0 and 1, which may represent a normalized cell current. As mentioned, it is just an example. The distribution and PDF of FIGS. 3A and 3B and following FIGS. 4 and 6 are merely exemplary, in particular they may not be obtained from real data and real cells.

In FIG. 3B it is shown Cumulative Distribution Functions (CDF), i.e., the probability of not exceeding a normalized value x.

Dashed lines of the PDF and CDF curves in FIGS. 3A, 3B represents the PDF and CDF of the maximum over two 0-cells, i.e., NVM cells storing a zero as state, and the minimum over two 1-cells, i.e., NVM cells storing a one as state, while solid lines represent the PDF curve of the single 0-cell and of the single 1-cell. Vertical lines indicate the mean value stored in the 0-cell and in the 1-cell.

Given the sorting operation, a decoding error may occur if the maximum pertaining the two 0-cells exceeds the minimum of the two 1-cells. Since the PDFs and CDF are slightly modified by the maximum and minimum operations, the performance is slightly degraded with respect to the pure differential scheme.

Thus, although a higher ratio than a differential cell may be achieved with the group of cells exemplified in Table 2, to achieve an even higher ratio R the number of cells Nc to jointly decode is high, e.g., Nc=8, which may complicate the decoder.

Therefore, the solution here described provides using a set of a number of cells Nc, like in Table 2, with Hamming distance at least of 2 between any codewords, in which the codeword or codewords stored in said group of cells belong to at least two subsets of a set of codewords obtainable by the stored values in the determined number Nc, e.g., 4, of non-volatile memory cells in a group, the codewords in a same subset having all the same Hamming weight. This, in an embodiment is obtained by adding the codewords 0000 and 1111, i.e., all zeroes and all ones, as shown in Table 5 herebelow, which shows such encoding T3.

TABLE 5

Encoding T3

| Subset SB | Code word CW | A | B | C | D | Symbol S | Bit map BM |
|---|---|---|---|---|---|---|---|
| SB1 | CW1 | 0 | 0 | 0 | 0 | 0 | 000 |
| SB2 | CW2 | 0 | 0 | 1 | 1 | 1 | 001 |
| SB2 | CW3 | 0 | 1 | 0 | 1 | 2 | 010 |
| SB2 | CW4 | 0 | 1 | 1 | 0 | 3 | 011 |
| SB2 | CW5 | 1 | 0 | 0 | 1 | 4 | 100 |
| SB2 | CW6 | 1 | 0 | 1 | 0 | 5 | 101 |
| SB2 | CW7 | 1 | 1 | 0 | 0 | 6 | 110 |
| SB3 | CW8 | 1 | 1 | 1 | 1 | 7 | 111 |

A first column is added which indicates the subset to which the codeword belongs, and a last column is also added indicating a bit map BM, i.e., a binary value of the Symbol S, corresponding to the Symbol S and to the codeword CW of the row.

Thus, a first subset SB1 comprises the all zero codeword CW1, a second subset SB2 comprises the codewords of Table 2, with two ones, which now are codewords from CW2 to CW7, and the third subset SB1 comprises the all ones codeword CW8.

Symbols S, or data labels, now range from 0 to 7. Therefore, the rate R is $\log_2(8)=3$ bit every Nc=4 cells.

With this embodiment, all codewords CW still have Hamming distance at least two from any other codeword.

However, the Hamming weight of the codewords CW is now constant with respect to each subset SB1, SB2, SB3. One codeword (all zeroes, or zero ones, subset SB1) has Hamming weight 0, six codewords (with two ones, subset SB2) have Hamming weight 2, and one codeword (all ones, subset SB3) has Hamming weight 4.

Therefore, with respect to the decoding and the decoder shown in FIG. 2C, the following may be used, in addition to the block 51, i.e., six comparators, there shown in FIG. 2:
two reference currents I_low and I_high, the second reference current greater than the first, to compute two corresponding decision thresholds T_low and T_high between the three subsets SB1, SB2, SB3, e.g., one between SB1 and SB2 and one between SB2 and SB3;
one sum circuit to compute a sum of the current of the predetermined number Nc, e.g., 4, of cells, sum current I_sum, which depends on the Hamming weight of the codeword.

A possible decoding scheme may comprise then:
exploiting the two thresholds T_low and T_high, to identify, by comparing the sum current I_sum separately with each of such two thresholds T_low and T_high to which subset SB1, SB2, SB3 the codeword stored in the group of cells belongs;
as in subset SB1 and SB3 there is one codeword CW and a corresponding decoded symbol Ŝ, in case of zero "ones" or four "ones," the codeword CW is identified (0000 or 1111, respectively) and the decoding operation is finished;
in case of two "ones" detected in the codeword CW, the six comparators perform the pairwise decoding as described with reference to FIG. 2B, 2C, possibly applying also majority decoding by pairwise comparisons.

The two reference currents I_low and I_high can be obtained as an average of the current of 16 non-volatile memory cells programmed at the same state (SET or RESET):
Iref_SET may be the average current of 16 SET cells, in logic one state;
Iref_RESET may be the average current of 16 RESET cells.

Alternatively, the currents can be obtained from a chosen typical cell in SET state or from another fixed current. So, the final reference currents I_low and I_high may be chosen as two linear combination of the two average current in SET and reset state, e.g.:

$$3*Iref\_SET+1*Iref\_RESET=I\_high$$

$$1*Iref\_SET+3*Iref\_RESET=I\_low$$

As mentioned, alternative I_high and I_low can also be originated by fixed cells.

Thresholds T_high and T_low, used to decide among codeword subsets, may either correspond respectively to the reference currents I_high and I_low, or can be a function of them.

With reference to FIG. 4, this figure is representing three PDF curves of the sum of the value (e.g., current) of four 0-cells SM0 in the group of Nc=4 cells, corresponding to the Hamming weight of subset SB1, sum of two 0-cells and two 1-cells SM2, corresponding to the Hamming weight of subset SB2, sum of four 1-cells SM4, corresponding to the Hamming weight of subset SB3. It has to be specified that the PDF curves are exemplary curves representative of subsets SB1, SB2, SB3, not necessarily obtained from real data and real cells, specifically the cells in the actual cell matrix being used for encoding and being then decoded. The thresholds T_high and T_low may be selected considering that the three PDF curves are in this case clearly distinguishable, and subsets SB1, SB2, SB3 can be decided by a thresholding mechanism, in particular placing thresholds near where the x coordinate where PDF curves SM0 and SM2 and respectively SM2 and SM4 intersect, indicates as thresholds T_high and T_low.

It is underlined that this is a simplification as the intersection of PDF curves is just an approximation of the optimal thresholds.

Defining X as the random variable associated to the "low current" state, and Y as the random variable associated to the "high current" state, the minimum error probability it may be achieved is $$P_{err} = P(X>Y) = \int_0^\infty f_X(x) P(Y<x) dx = \int_0^\infty f_X(x) F_Y(x) dx, \quad (1)$$

where $f_X(x)$ is a probability density function and $F_Y(x)$ is a cumulative distribution function (i.e., the functions both shown in FIGS. 3A-3B). For x close to 0, $f_X(x)$ is high but $F_Y(x)$ is very small. Vice versa, for x high, $F_Y(x)$ approaches 1 but $f_X(x)$ vanishes. Therefore, the main contributions to the result are gathered by the integral when $f_X(x)$ and $F_Y(x)$ are almost the same. Since $F_Y(x)$ is quite steep, its rising edge can be approximated with the one of the corresponding PDF $f_Y(x)$. All in all, placing thresholds at the intersection point of PDF curves works fine and provides similar error probability, but it does not exactly match the numerically optimized thresholds T_low, T_high, which are indeed the ones shown in FIG. 4, and are not exactly superposed to the intersection points of the PDF curves. Also other factors can influence the position of the optimized thresholds T_low, T_high, such as subsets with different probability of being selected such as in Table 5, leading to adjustments of their value.

Thus, summing up a possible way of computing said thresholds T_high, T_low or respectively center threshold T_center, described in the following, operate on the basis of Probability Density Function curves and/or Cumulative Distribution Function curves of the sum of the values of cells arranged in manner corresponding to each subset, this in particular by selecting as approximation of the threshold or thresholds values the intersection or intersections or near to said intersection or intersections of said PDF curves (or CDF curves) as an approximation or computing said threshold or thresholds values numerically by minimizing an error probability between the states associated to said thresholds. As mentioned, the main contributions to the result are gathered by the integral of equation (1) when the PDF $f_X(x)$ of state X and the CDF of state Y $F_Y(x)$ are almost the same.

The possibility of distinguishing by thresholding represents a relevant difference compared to the single-cell encoding of Table 1 and Table 2 where the PDFs of the 0 and of the 1 are too packed.

In order not to incur a reliability degradation, thresholds T_low and T_high may be preferably put close to the intersection point of the PDFs, since T_low=I_low and T_high=I_high," would be heavily sub-optimal.

Since optimal thresholds T_low and T_high, as shown in FIG. 4, are values typically lower than I_low and I_high, i.e., lower than 1 and 3 they can be approximated as:

$$T\_low = K * I\_low$$

$$T\_high = K * I\_high$$

where K is an optimization constant whose value can be chosen. In FIG. 4 a value of 0.9 is used.

The relation between the reference currents I_high and I_low, and the thresholds T_high and T_low, has preferably to be characterized, in particular optimized as just discussed, since decisions based on thresholds T_high and T_low can be an additional source of errors, and may spoil the performance, or they may have a different correction coding scheme, to match a same performance.

The linearly dependent model for thresholds T_low=K*I_low and T_high=K*I_high is a possible example. An alternate definition could be:

$$T\_low = K * I ref\_SET$$

$$T\_high = K * 3 * I ref\_SET,$$

which approximately assumes Iref_RESET=0. Of course, if the definition changes, constant K should be re-tuned as well.

Figure 5A:
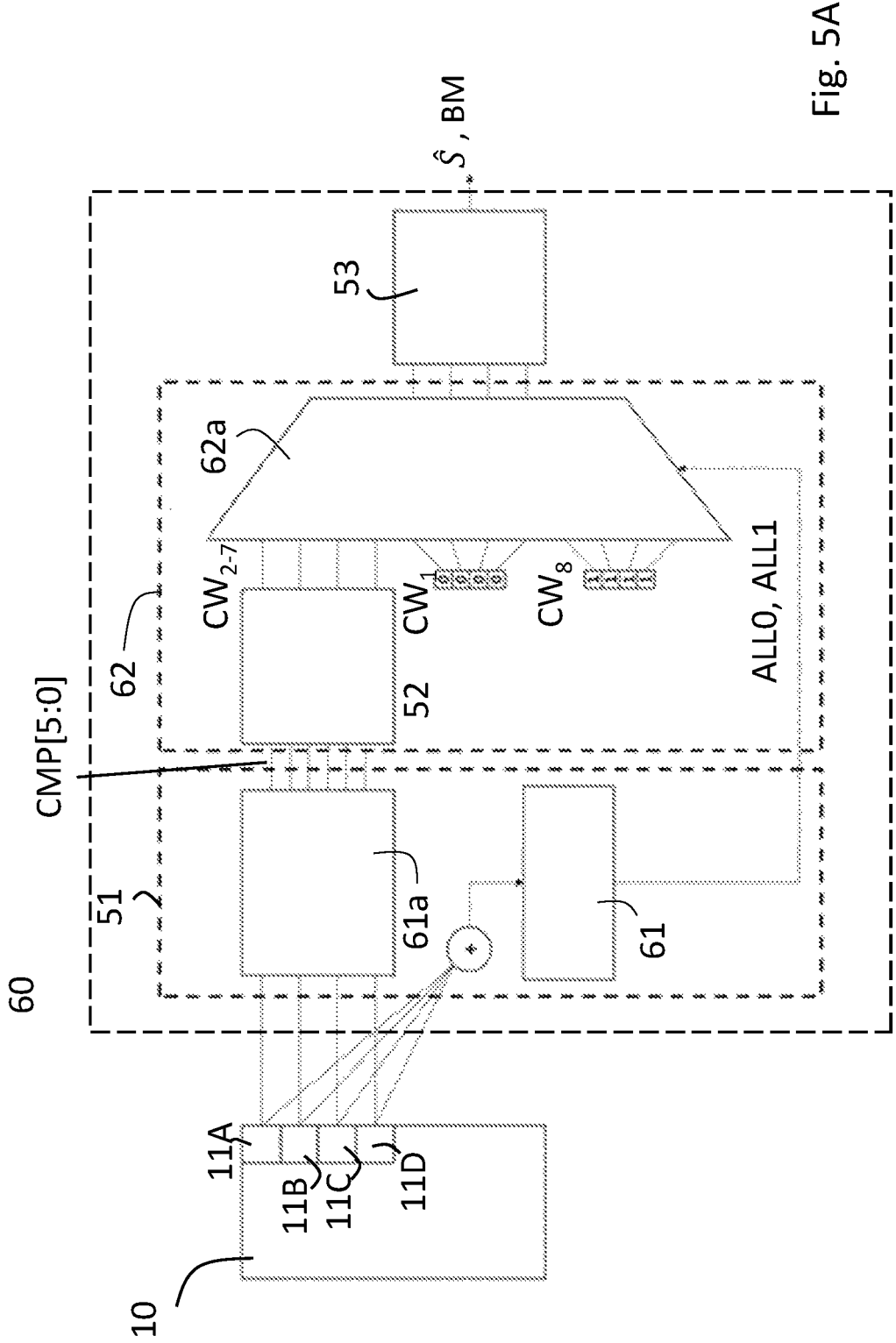
FIG. 5A shows schematically a second embodiment of a decoder circuit here described.

In FIG. 5A it is shown a decoder 60 configured to operate with the set of four cells like in Table 5, i.e., comprising also the all zeroes (zero ones) and all ones combinations, besides the two one combinations, i.e., comprising subsets SB1, SB2, SB3.

The decoder 60 corresponds to the architecture 50 in that comprises again the block 51 which receives the currents IcellA, IcellB, IcellC, IcellD and it is configured to perform a comparison of the cell values comparing them pairwise, obtaining respective pairwise comparison results, CMP[0] . . . CMP[5].

However, the architecture 60 comprises summing the read values, i.e., the cells currents IcellA, IcellB, IcellC, IcellD, in a sum circuit 62 to obtain a sum current, I_sum, and comprises then a comparator 61 to compare the value of said sum current, I_sum, to one or more thresholds each corresponding to a subset obtaining a value indicating the subset to which the read values belong, specifically the comparator 61 compares the sum current I_sum to a high threshold T_high and to a low threshold T_low, outputting threshold comparison signal, i.e., all zero signal ALL0 if the sum current I_sum is below the low threshold T_low, i.e., a value indicating that the cells current values are determined by the codeword belonging to subset S1 and outputting an all one signal ALL1 if the sum current I_sum is above the high threshold T_high, i.e., a value indicating that the cells current values are determined by the codeword belonging to subset SB3.

Then a block configured for processing the comparison results 62 is provided which receives the comparison results from block 51 and the output of comparator 61. The block configured for processing the comparison results 62 comprises the block 52 configured to process the set of pairwise comparison results CMP[0 . . . 5] obtaining a corresponding read codeword CW (among codewords $CW_{2-7}$ of subset SB2) which is fed as input to a selection block 62a, which receives also as inputs the single codewords $CW_1$ and $CW_8$ of the subsets SB1 and SB3. The selection block 62a, which is represented here as a multiplexer, selects its output, i.e., the read codeword CW, on the basis of a selections signal represented by the threshold comparison signal ALL0, ALL1. In other the selection block 62a if the threshold comparison signal is ALL0 selects the codewords $CW_1$ as output, if the threshold comparison signal is ALL1 selects the codewords $CW_8$ as output, else choses the codeword among codewords $CW_{2-7}$ of subset SB2 determined by block 51, to be sent to the decoder 53 as read codeword CW.

Figure 5B:
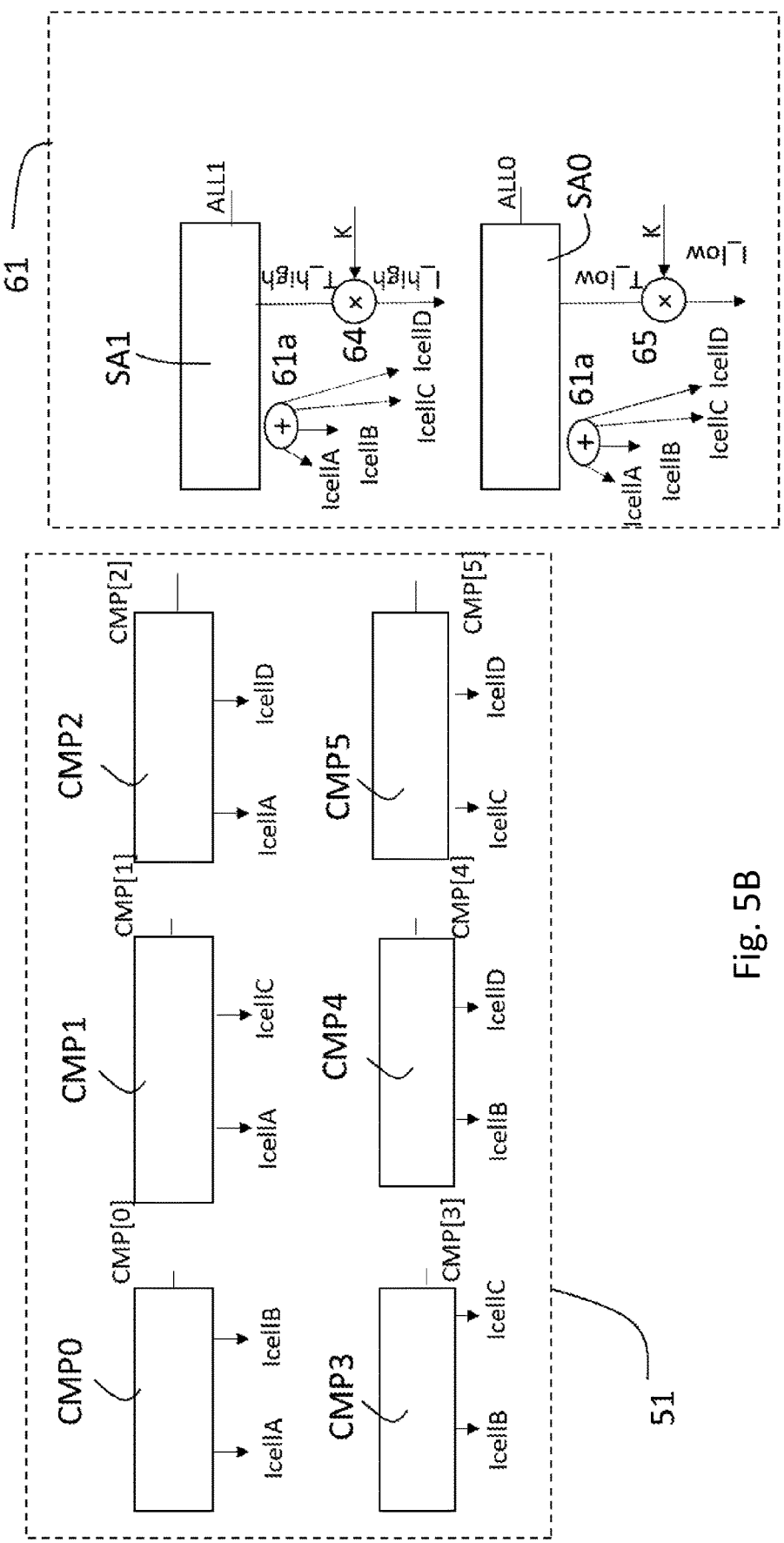
FIG. 5B shows an implementation of the second embodiment of a decoder circuit here described.

In FIG. 5B it shown in greater detail comparison block comprising the block 51 which comprises again six comparators CMP0, CMP1, CMP2, CMP3, CMP4, CMP5, which compare pairwise the currents of the cell 11A, 11B, 11C, 11D. Comparator CMP0 compares the cell currents IcellA and IcellB and outputs a comparator signal CMP[0]. Again, currents are inputs to the comparators, but they are represented as if they were outputs, to mimic the electrical circuit, where cells in SET state drain current.

The architecture 60 however further comprises a threshold comparator 61 which includes two sense amplifier, SA0 and SA1, which receive each the sum of the currents of the four cells, IcellA, IcellB, IcellC and IcellD as input, i.e., I_sum. The sense amplifier SA0, which is configured to sense all zeroes in the set of cell, receives a low threshold T_low, which in the example is obtained by a multiplier multiplying the low current I_low by the optimization constant K in a multiplier circuit 65.

The sense amplifier SA1, which is configured to sense all ones in the group of Nc cell, receives a threshold T_high, which in the example is obtained by a multiplier multiplying the current I_high by the optimization constant K in a multiplier circuit 64.

Therefore, amplifiers SA0 and SA1 can sense if the sum current Isum is below the threshold T_low, i.e., an all zero combination is present and respectively if the sum current I_sum is above the high threshold T_high, i.e., an all ones combination is present The output CMP[5:0], along with outputs ALL1 and ALL0 from sense amplifiers SA0 and SA1, fully determine the decided codeword. The pattern of outputs can be interpreted for instance by a look up table or LUT, not shown in FIG. 5B, but embodying block 53 of FIG. 5A containing the binary data sequence (bit map BM) corresponding to the codeword CW, i.e., the decoded symbol $\hat{S}$.

The mapping between codewords and data labels can be any. However, the one reported in Table 5 with reference to column BM may be attractive because the binary data sequence (bit map) corresponds to the content of cells 12A, 12B and 12C. Therefore, a LUT containing the binary data sequence (bit map) corresponding to the codeword is not necessary, as it is sufficient to take the first three symbols of the codeword, states A, B, C, taken in order.

Thus, the embodiment of the solution illustrated with reference to Table 5 allows keeping the group length fixed (Nc=4) and provides a ratio R=3/4, which is higher than R=5/8 of the embodiment of Table 2. Equivalently, keeping the code rate or ratio R=3/4 fixed, this embodiment achieves it with a smaller group block (Nc=4) with respect to the embodiment of Table 3 (Nc=8 in that case).

Since, as mentioned, errors may arise from threshold selection, a variant of the embodiment referred to Table 5, indicated with T4, may therefore adopt one threshold, i.e., two subsets SB1, SB2 as shown in Table 6, although coding is still shared between the same number Nc=4 of cells. In this way is possible to adopt one threshold, and to choose among two subsets (the first with one "one," the second using three "ones").

Table 6 has the same columns of Table 5.

The first four rows correspond to a first subset SB'1, with a single one in the corresponding combinations of states ABCD, i.e., codewords CW1-CW4 and the second four rows to a second subset SB'2 with three ones in the corresponding combinations, i.e., codewords CW5-CW8.

There are still 8 codewords, therefore the ratio R is the same as the embodiment of Table 4 (R=3/4).

TABLE 6

Encoding T4

| Subset SB | Code word CW | A | B | C | D | Symbol | Bit map BM |
|---|---|---|---|---|---|---|---|
| SB'1 | CW1 | 1 | 0 | 0 | 0 | 0 | 000 |
| SB'1 | CW2 | 0 | 1 | 0 | 0 | 1 | 001 |
| SB'1 | CW3 | 0 | 0 | 1 | 0 | 2 | 010 |
| SB'1 | CW4 | 0 | 0 | 0 | 1 | 3 | 011 |
| SB'2 | CW5 | 0 | 1 | 1 | 1 | 4 | 100 |
| SB'2 | CW6 | 1 | 0 | 1 | 1 | 5 | 101 |
| SB'2 | CW7 | 1 | 1 | 0 | 1 | 6 | 110 |
| SB'2 | CW8 | 1 | 1 | 1 | 0 | 7 | 111 |

A possible decoding scheme is the following one:
compute the sum of the cell currents, namely, I_sum
exploiting the threshold, determine which subset the codeword belongs to:
Subset SB'1, i.e., one "one"
Subset SB'2, i.e., three "ones"
perform pairwise comparisons between the currents of the Nc=4 cells (overall, 6 comparators are used);
according to the choice of the subset, find either the position of the maximum current (subset 0), or the position of the minimum current (subset 1). In other words, find the "one" in subset 0 and the "zero" in subset 1.

This way, the stored codeword is uniquely determined.

The threshold is derived by (and potentially may be chosen equal to) the reference current $$I\_center = 2*Iref\_SET + 2*Iref\_RESET.$$

Again, the reference current can be obtained as a mean of 16 cells programmed at the same state (SET or RESET). This can be a fixed current also, as in the previous case.

The mapping between codewords and data labels can be any. However, the one reported in Table 6 is attractive because:
the leftmost bit of the binary label (Bit map BM) identifies the bit of the subset, SB'1 or SB'2 (subset 0 or subset 1);
the other two bits are the position of the minimum/maximum, among the four cells of the group.

Therefore, a LUT containing the binary data sequence (bit map) corresponding to the codeword may be not necessary In FIG. 6 the PDF, like in FIG. 4 is shown, comprising in one curve SM3 the sum of three 0-cells and one 1-cell and in the other, SM3' the sum of one 0-cell and three 1-cell.

As in FIG. 4, the PDFs of the subsets are clearly distinguishable, but there is one threshold to optimize.

The distribution and PDF of FIGS. 3A,3B, 4 and 6 are exemplary, and the present disclosure is not limited to them. e.g., their tails may occur at higher values than real ones, for graphical purposes.

Figure 7A:
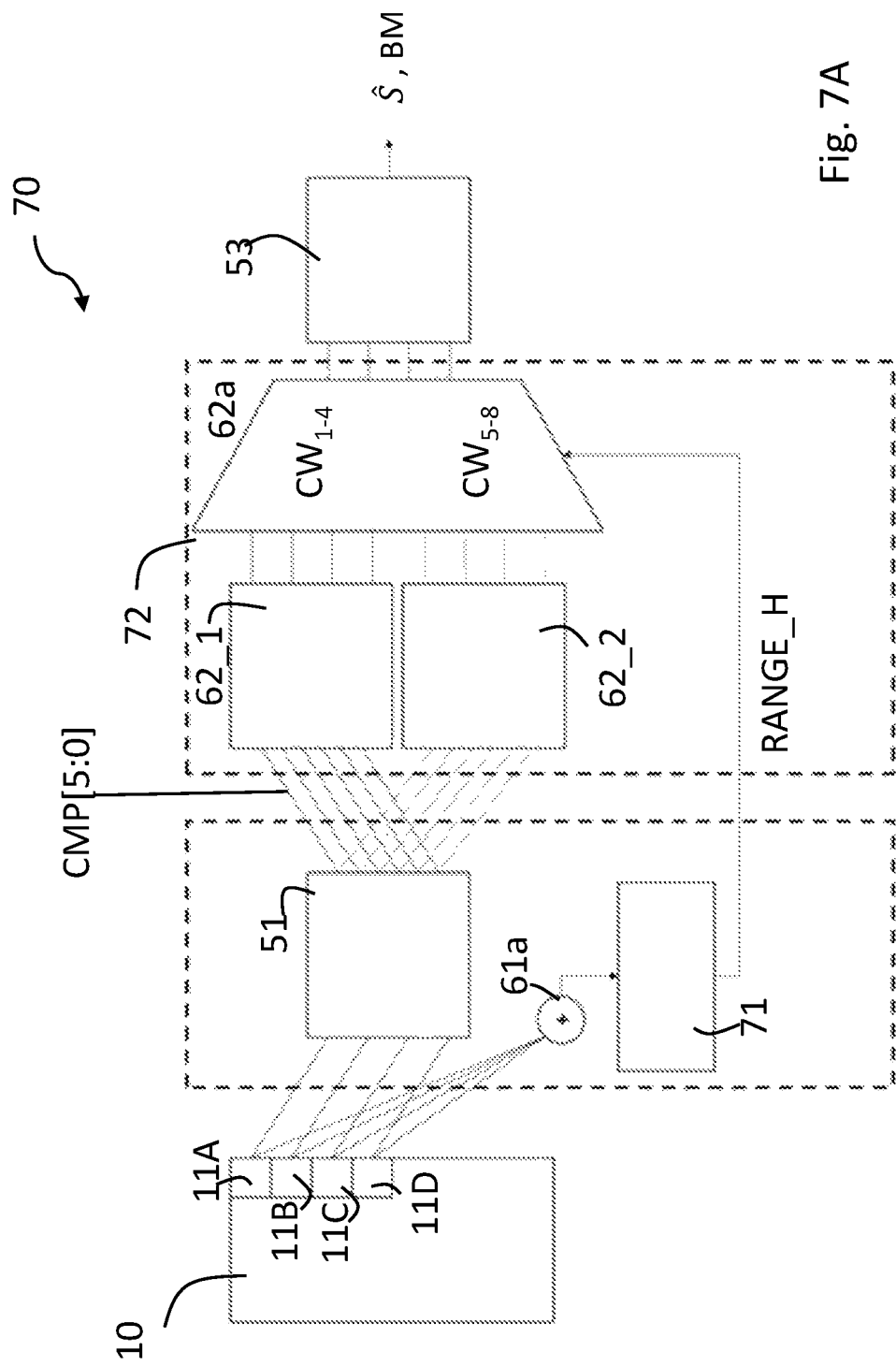
FIG. 7A shows schematically a third embodiment of a decoder circuit here described.

In FIG. 7A it is shown a decoder 70 configured to operate with the set of four cells like in Table 6, i.e., with the two subsets SB'0, SB'1.

The decoder 70 corresponds to the architecture 50 in that comprises again the block 51 which receives the currents IcellA, IcellB, IcellC, IcellD and it is configured to perform a comparison of the cell values comparing them pairwise, obtaining respective pairwise comparison results, CMP[0] . . . CMP[5], as well as it comprises summing the read values, i.e., the cells currents IcellA, IcellB, IcellC, IcellD, in a sum circuit 61a to obtain a sum current, I_sum, and comprises then a comparator 71 to compare the value of said sum current, I_sum, to one or more thresholds each corresponding to a subset obtaining a value indicating the subset to which the read values belong. However, specifically the comparator 71 compares the sum current I_sum to a center threshold T_center, outputting a threshold comparison signal RANGE_H, which is for instance zero if the sum current I_sum is below the center threshold T_center, i.e., a value indicating that the cells current values are determined by a codeword belonging to subset S'1, or one if the sum current I_sum is above the center threshold T_center, i.e., a value indicating that the cells current values are determined by a codeword belonging to subset S'2.

Then a block configured for processing the comparison results 72 is provided which receives the comparison results from block 51 and the output of comparator 61. The block configured for processing the comparison results 62 comprises a block 62_1 configured to process the set of pairwise comparison results CMP[0 . . . 5] on the basis of the codewords of the first subsets SB'1, obtaining a corresponding codeword CW (among codewords $CW_{1-4}$ of subset SB'1) which is fed as input to the selection block 62a, and a block 62_2 configured to process the set of pairwise comparison results CMP[0 . . . 5] on the basis of the codewords of the second subset SB'2, obtaining a corresponding codeword CW (among codewords $CW_{5-8}$ of subset SB'2), which is also fed as input to the selection block 62a. The selection block 62a, which is represented here as a multiplexer, selects its output, i.e., the read codeword CW, on the basis of a selections signal represented by the threshold comparison signal RANGE_H. In other words, the selection block 62a if the signal threshold comparison signal RANGE_H is, in the example here, zero, choses the codeword among codewords $CW_{1-4}$ of subset SB'1, else if the signal threshold comparison signal RANGE_H is, in the example here, one, choses the codeword among codewords $CW_{5-8}$ of subset SB'2, to be sent to the decoder 53 as read codeword CW.

Figure 7B:
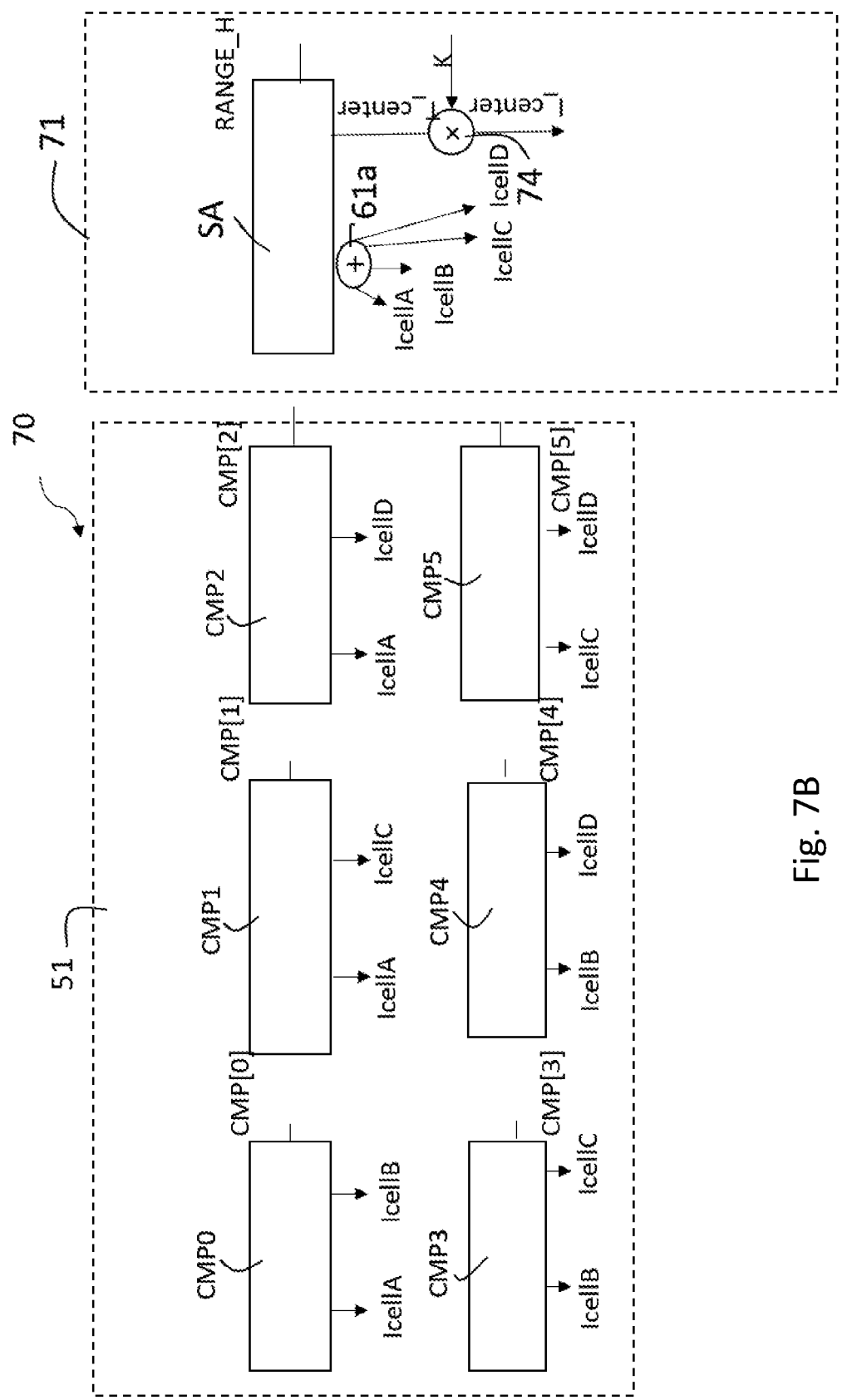
FIG. 7B shows an implementation of the third embodiment of a decoder circuit here described.

In FIG. 7B it shown in greater detail the comparison block comprising the block 51 which comprises again six comparators CMP0, CMP1, CMP2, CMP3, CMP4, CMP5, which compare pairwise the currents of the cell 11A, 11B, 11C, 11D. Comparator CMP0 compares the cell currents IcellA and IcellB and outputs a comparator signal CMP[0]. Again, currents are inputs to the comparators, but they are represented as if they were outputs, to mimic the electrical circuit, where cells in SET state drain current.

The architecture 70 however comprises a range comparator CMPR, embodying comparator 71, which receives the sum of the currents of the four cells, IcellA, IcellB, IcellC and IcellD as input, i.e., I_sum, obtained by the sum circuit 61a. The range comparator CMPR receives a single center threshold T_center, which in the example is obtained by a multiplier multiplying a center current I_center by the optimization constant K in a multiplier 74.

The output CMP[5:0], along with output RANGE_H from CMPR, fully determine the decided codeword.

All the comparisons can be performed in parallel.

An alternative decoding scheme, that probably would provide a lower error rate, may be based on the observation that the cell associated to the minimum current, and the one associated to the maximum current, are equal to 0 and 1 respectively, regardless of the value of the output RANGE_H.

Therefore, one may postpone the choice of the subset after the selection of two bits out of four (the ones associated to the minimum and maximum current).

The remaining two bits (those with the second and the third ranked currents), are equal to either 00 or 11, and their decision should be less noisy because the sum of just 2 currents (instead of 4) is involved.

AS mentioned, the number of cells in a group is greater than two. Even values of number cells may attain a higher rate R, but number Nc is not necessarily an even number. Combinations of (Nc−1)/2 ones in Nc cells or (Nc+1)/2 ones in Nc cells could be used if Nc is an odd value. For instance, the number Nc can be three as shown in the Table 7 below. With three cells and two subsets there are four codewords to be used. Of course also the complementary codewords {100, 010, 001, 111} can be used.

TABLE 7

| A | B | C | Subset |
|---|---|---|--------|
| 0 | 0 | 0 | SB1 |
| 0 | 1 | 1 | SB2 |
| 1 | 0 | 1 | SB2 |
| 1 | 1 | 0 | SB2 |

In the same way, subsets can be more than three. In the example below (Table 8) with Nc=8 cells, there are five subsets SB1, SB2, SB3, SB4, SB5.

TABLE 8

| ABCDEFGH | Subsets |
|----------|---------|
| 00000000 | SB1 |
| 00000011 | SB2 |
| 00000101 |  |
| 10100000 |  |
| 11000000 |  |
| 00001111 | SB3 |
| 00011101 |  |
| 11110000 |  |
| 10111000 |  |
| 00111111 | SB4 |
| 01111101 |  |
| 10111110 |  |
| 11111100 |  |
| 11111111 | SB5 |

Each of the subsets has Hamming distance of 2, with respect to the other.

To compute the overall array efficiency also an error correction code (ECC) should be considered.

Within blocks of Nc cells, the solutions of Tables 5 and 6 generate correlated errors, e.g., when the detector selects the wrong subset, all the other bits are most probably wrong, and the error correction/detection capability of a binary BCH code would be likely exceeded, undermining the ECC presence.

Therefore, codes able to correct blocks of errors, like Non-Binary BCH (NB-BCH) codes and Reed-Solomon (RS) codes, should be preferred. RS codes are a special case of NB-BCH codes.

Decoding of NB-BCH codes is very similar to decoding of binary BCH codes. Yet, an additional decoding step is used: once the position of the errors has been determined, one has to find also the value of the error.

The price for the improved robustness of a NB-BCH code is the increased redundancy.

A comparison of the following two solutions here is made:
  differential encoding scheme, with DEC+TED binary BCH code
  the solution with the encoding T4 or T5 of Table 5 or 6 with DEC+TED non-binary BCH code.
  Considering for instance a block of 64 information bit:
  in the differential case, one encoded bit takes two cells. The redundancy of the code is 15 bit. Overall: 2*(64+15)=158 bits are used.

In the solution here described, every block of four cells carries three encoded bits. Therefore, 22 blocks of cells (corresponding to 22 BCH symbols) are used to encode 66 bits. The redundancy introduced by the NB-BCH code is 9 symbols. Overall, (22+9)*4=124 cells are used, saving about 21% with respect to the differential case.

Further improvements can be obtained by the solution here described, considering that:

the NB-BCH code is strongly shortened, reducing the number of information symbols from 54 to 22. By optimizing the position of the shortened information symbols, one parity symbol can be forced to be always 0, thus there is no point in saving it in memory. Overall: (22+8)*4=120 cells would be used with this improvement;

with the solution here described 64 bits are stored, not 66. Therefore, we can use 21 blocks of information symbols instead of 22, and save the last bit with the differential scheme. Overall: (21+9)*4+1*2=122 cells would be used with this improvement.

Adopting both the improvements, it is achieved (21+8)*4+1*2=118 cells (23% saving).

It is observed that the solution of Table 6 with respect to the solution of Table 5 utilizes one threshold, and one reference current. As just said, there is the possibility to improve the error rate by estimating two bits first, and determining the subset (i.e., the remaining bits) by a less noisy comparison.

The solution of Table 5, given that the drift of cells in the SET state is higher than the drift of the cells in the RESET state, has subsets with codewords which are more equally prone to errors than codewords belonging to Subset 0.

The described solution thus has several advantages with respect to the prior art solutions.

The solution here described allow using groups of cells bigger than the ones of differential cells, with a higher efficiency, e.g., 0.75 bit per cell for the solution of Table 5, with the same number of cells in a group, by allowing more patterns and partitioning them in subsets. The solution of Table 6, in particular, utilizes the computation of just one threshold.

In general the solution here described allows to obtain a higher density of PCM arrays.

Also the solution here described necessitates less PCM cells to compose the array, determining a possible yield improve.

Also, if a TEC code is deployed, the solution here described allows to achieve simultaneous improvement of bit-error-rate and area density (e.g., 130 cells used with respect to 158).

With the solution proposed test and measure the DAC circuitry, in order to better screen manufacturing defects are possible, reducing the time to perform the test and the testing cost.

The solution described allows by an internal built in self-test to avoid interaction with external instrumentation. Furthermore, self-test may be highly configurable by user (number of switches to be tested, speed, and others parameters can be configurable).

The solution described allows detailed information to better localize the defects found.

Of course, without prejudice to the principle of various embodiments of the present disclosure, the details of construction and the embodiments may vary widely with respect to what has been described and illustrated herein purely by way of example, without thereby departing from the scope of the present disclosure.

A method for storing information in a coded manner in non-volatile memory cells may be summarized as including providing a group of non-volatile memory cells (11A, 11B, 11C, 11D) of non-volatile memory, the memory cell being of the type in which a stored logic state (A, B, C, D), which can be logic high or logic low, can be changed through application of a current to the cell and the state in the memory cell is read by reading a current (IcellA, IcellB, IcellC, IcellD) provided by the cell (11A, 11B, 11C, 11D), comprising a determined number (Nc) of non-volatile memory cells which is greater than two, the group of non-volatile memory cells (11A, 11B, 11C, 11D) storing a codeword (CW) formed by the values of said stored states (A, B, C, D) of the cells (11A, 11B, 11C, 11D) of the group taken according to a given order, wherein given a set of codewords (CW) obtainable by the stored values (A, B, C, D) in the determined number of non-volatile memory cells (11A, 11B, 11C, 11D) in a group, storing the information in at least two subsets (SB1, SB2, SB3; SB'1, SB'2) of said set of codewords (CW) comprising each at least a codeword (CW), each codeword (CW) in a same subset having a same Hamming weight, each codeword (CW) belonging to one subset (SB1, SB2, SB3; SB'1, SB'2) having a Hamming distance equal or greater than two with respect to each codeword belonging to another subset.

The determined number (Nc) of non-volatile memory cells (11A, 11B, 11C, 11D) may be an even number, in particular is four.

The method may be provided a first subset (SB1) with a codeword with all zero values, a second subset (SB2) in which the codewords have all the same Hamming weight, a third subset (SB3) with a codeword with all one values.

The method may be provided a first subset (SB'1) in which the codewords have all a same first Hamming weight and a second subset (SB'2) in which the codewords have all a same second Hamming weight, different from the first Hamming weight by the value two.

A method of decoding a group of cells according to any of the embodiments discussed above may be summarized as including reading the values (IcellA, IcellB, IcellC, IcellD) stored in the cells of a group, in particular reading their cell currents, performing a comparison operation on said read values, comprising comparing pairwise, comparing each read value (IcellA, IcellB, IcellC, IcellD) from a cell (11A, 11B, 11C, 11D) once with each other read value (IcellA, IcellB, IcellC, IcellD) from the other cells (11A, 11B, 11C, 11D) in the group, all said read values forming a set of pairwise comparison results (CMP[0 . . . 5]), processing the set of pairwise comparison results (CMP[0 . . . 5]) obtaining the corresponding codeword (CW), decoding the corresponding codeword (CW) to supply a corresponding decoded symbol (Ŝ; BM).

The comparison operation on said read values (IcellA, IcellB, IcellC, IcellD) may also include summing said read values (IcellA, IcellB, IcellC, IcellD) to obtain a sum value (I_sum) and comparing said sum value (I_sum) to one or more thresholds (T_high, T_low; T_center) each corresponding to a subset (SB1, SB2, SB3; SB'1, SB'2) obtaining a value indicating the subset to which the read values of the codeword (CW) belong, processing the set of pairwise comparison results separately for each subset (SB3; SB'1, SB'2) including more than one codeword obtaining corresponding codewords, then selecting among said corresponding codewords and codewords of subsets (SB1, SB2) including one codeword on the basis of the value indicating the subset to which the read values belong, decoding the corresponding codeword (CW) to supply a corresponding decoded symbol (Ŝ; BM).

The method may include computing said thresholds (T_high, T_low; T_center) on the basis of Probability Density Function curves and/or Cumulative Distribution Function curves of the sum of the values of cells arranged in manner corresponding to each subset, in particular selecting as an approximation of the threshold or thresholds values the intersection or intersections or near to said intersection or intersections of said PDF curves or computing said threshold or thresholds values numerically by minimizing an error probability between the states associated to said thresholds.

A memory (10), in particular a PCM memory, may be summarized as including groups of non-volatile memory cells, the memory cell being of the type in which a stored logic state (A, B, C, D), which can be logic high or logic low, can be changed through application of a current to the cell and the state in the memory cell is read by reading a current (IcellA, IcellB, IcellC, IcellD) provided by the cell (11A, 11B, 11C, 11D), including a determined number of non-volatile memory cells which is greater than two, said memory (10) including an encoder configured to perform the method for storing information in a coded manner in non-volatile memory cells according to any of the embodiments discussed above.

A memory (10) may be summarized as including an encoder (40) configured to perform the method for storing information in a coded manner in non-volatile memory cells according to any of the embodiments discussed above.

A memory (10) according to claim 8, may be summarized as including a decoder (51, 61) configured to perform the method of decoding a group of cells for storing information in a coded manner in non-volatile memory cells according to any of the embodiments discussed above.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    providing a group of non-volatile memory cells of non-volatile memory,
        stored logic states in the group of non-volatile memory cells configured to change through application of currents to the group of non-volatile memory cells, and configured to be read by reading currents provided by the group of non-volatile memory cells,
        the group of non-volatile memory cells including a determined number of non-volatile memory cells that is greater than two,
        the group of non-volatile memory cells configured to store codewords formed by values of the stored logic states of memory cells of the group of non-volatile memory cells taken according to a given order; and
    storing information in at least two subsets of a set of codewords,
        the set of codewords obtainable by the values of the stored logic states, each codeword in a same subset having a same Hamming weight,
        each codeword belonging to a first subset of the at least two subsets having a Hamming distance equal or greater than two with respect to each codeword belonging to a second subset of the at least two subsets,
        each codeword belonging to the first subset having a number of ones and a number of zeroes equal to the number of ones.

2. The method of claim 1, wherein the determined number of non-volatile memory cells is an even number.

3. The method of claim 1, wherein the determined number of non-volatile memory cells is four.

4. The method of claim 1, wherein the at least two subsets include a subset with a codeword having all zero values, and a subset with a codeword having all one values.

5. The method of claim 1, wherein the at least two subsets include a subset with codewords having the same first Hamming weight, and a subset with codewords having the same second Hamming weight that is different from the first Hamming weight by a value of two.

6. The method of claim 1, further comprising:
    reading the values of the stored logic states;
    performing a comparison operation on the read values of the stored logic states;
    obtaining a corresponding codeword by processing results of the comparison operation; and
    decoding the corresponding codeword to supply a corresponding decoded symbol.

7. The method of claim 1, wherein the reading of the values includes reading currents of the memory cells of the group of non-volatile memory cells.

8. The method of claim 6, wherein the performing of the comparison operation includes comparing each read value from a memory cell in the group once with each other read value from remaining memory cells in the group.

9. The method of claim 4, wherein the first subset is between the subset with the codeword having all zero values and the subset with the codeword having all one values in a bitmap.

10. A method, comprising:
    reading values of stored logic states in memory cells of a group of non-volatile memory cells,
        the stored logic states configured to change through application of currents to the group of non-volatile memory cells, and configured to be read by reading currents provided by the group of non-volatile memory cells,
        the group of non-volatile memory cells including a determined number of non-volatile memory cells that is greater than two,
        the group of non-volatile memory cells storing a codeword formed by the values of the stored logic states taken according to a given order,
        information being stored in at least two subsets of a set of codewords,
        the set of codewords obtainable by the values of the stored logic states, each codeword in a same subset having a same Hamming weight,
        each codeword belonging to a subset of the at least two subsets having a Hamming distance equal or greater than two with respect to each codeword belonging to another subset of the at least two subsets;
    performing a comparison operation on the read values of the stored logic states, the performing of the comparison operation including:
        comparing each read value from a memory cell in the group once with each other read value from remaining memory cells in the group to obtain pairwise comparison results;
        summing the read values of the stored logic states to obtain a sum value; and
        comparing the sum value to one or more thresholds to obtain a value indicating a subset to which the read values belong;
    obtaining a corresponding codeword by processing results of comparison operation, the processing of the results of the comparison operation including:

processing the pairwise comparison results separately for each subset including more than one codeword to obtain corresponding codewords; and selecting among the corresponding codewords and codewords of subsets including one codeword based on the value indicating the subset to which the read values belong; and decoding the corresponding codeword to supply a corresponding decoded symbol.

11. The method of claim 10, wherein the reading of the values includes reading currents of the memory cells of the group of non-volatile memory cells.

12. The method of claim 10, further comprising:

computing the one or more thresholds based on Probability Density Function curves or Cumulative Distribution Function curves of a sum of values of memory cells arranged in manner corresponding to each of the at least two subsets.

13. The method of claim 12, further comprising:

selecting one or more intersections of the Probability Density Function curves as the one or more thresholds.

14. The method of claim 12, further comprising:

computing the one or more thresholds numerically by minimizing an error probability between states associated to the one or more thresholds.

15. The method of claim 10, wherein the determined number of non-volatile memory cells is an even number.

16. A memory, comprising:

a group of non-volatile memory cells, stored logic states in the group of non-volatile memory cells configured to change through application of currents to the group of non-volatile memory cells, and configured to be read by reading currents provided by the group of non-volatile memory cells, the group of non-volatile memory cells including a determined number of non-volatile memory cells that is greater than two, the group of non-volatile memory cells configured to store codewords formed by values of the stored logic states of memory cells of the group of non-volatile memory cells taken according to a given order; and an encoder configured to store information in at least two subsets of a set of codewords, the set of codewords obtainable by the values of the stored logic states, each codeword in a same subset having a same Hamming weight, each codeword belonging to a first subset of the at least two subsets having a Hamming distance equal or greater than two with respect to each codeword belonging to a second subset of the at least two subsets, each codeword belonging to the first subset having a number of ones and a number of zeroes equal to the number of ones.

17. The memory of claim 16, wherein the determined number of non-volatile memory cells is an even number.

18. The memory of claim 16, wherein the at least two subsets include a first subset with a codeword having all zero values, and a subset with a codeword having all one values.

19. The memory of claim 16, wherein the at least two subsets include a subset with codewords having the same first Hamming weight, and a subset with codewords having the same second Hamming weight that is different from the first Hamming weight by a value of two.

20. The memory of claim 16, further comprising:

a decoder configured to read the values of the stored logic states, perform a comparison operation on the read values of the stored logic states, obtain a corresponding codeword by processing results of the comparison operation, and decode the corresponding codeword to supply a corresponding decoded symbol.

* * * * *

UNITED STATES PATENT AND TRADEMARK OFFICE
CERTIFICATE OF CORRECTION

Page 1 of 1

PATENT NO. : 12,451,185 B2
APPLICATION NO. : 18/148378
DATED : October 21, 2025
INVENTOR(S) : Alessandro Tomasoni et al.

It is certified that error appears in the above-identified patent and that said Letters Patent is hereby corrected as shown below:

In the Claims

Column 22, Claim 18, Line 22:
"include a first subset" should read: --include a subset--.

Signed and Sealed this
Sixth Day of January, 2026

John A. Squires
*Director of the United States Patent and Trademark Office*